(12) United States Patent
Zhao

(10) Patent No.: US 8,984,996 B2
(45) Date of Patent: Mar. 24, 2015

(54) FULL-AUTOMATIC OPTICAL FIBER CONTAINER

(75) Inventor: Yangri Zhao, WeiHai (CN)

(73) Assignee: DH Infotech (Weihai) Inc., Weihai (CN)

( * ) Notice: Subject to any disclaimer, the term of this patent is extended or adjusted under 35 U.S.C. 154(b) by 0 days.

(21) Appl. No.: 14/129,115

(22) PCT Filed: May 11, 2012

(86) PCT No.: PCT/CN2012/075395
§ 371 (c)(1),
(2), (4) Date: Dec. 24, 2013

(87) PCT Pub. No.: WO2013/166724
PCT Pub. Date: Nov. 14, 2013

(65) Prior Publication Data
US 2014/0130651 A1    May 15, 2014

(51) Int. Cl.
*G02B 6/46* (2006.01)
*G02B 6/25* (2006.01)

(52) U.S. Cl.
CPC ... *G02B 6/46* (2013.01); *G02B 6/25* (2013.01)
USPC .......................................................... 83/167

(58) Field of Classification Search
CPC .................................. G02B 6/46; G02B 6/00
USPC ........... 83/167, 613–641, 940, 318, 337, 646, 83/24, 452; 29/33.52, 566.3, 569.4; 81/9.41, 628, 9.51; 65/174; 225/100, 225/96.5, 101, 105, 103, 96, 2, 96.2, 4; 30/190

See application file for complete search history.

(56) References Cited

U.S. PATENT DOCUMENTS

| 5,395,025 A | * | 3/1995 | Borer et al. ...................... 225/2 |
| 6,598,508 B1 | * | 7/2003 | Ishikawa et al. ................ 83/613 |
| 2002/0073815 A1 | * | 6/2002 | Dean et al. ........................ 83/24 |

FOREIGN PATENT DOCUMENTS

| CN | 2765201 Y | 3/2006 | |
| CN | 201434919 Y | 3/2010 | |
| JP | 2005301142 A | * 10/2005 | .............. G02B 6/00 |
| JP | 2009-244403 A | 10/2009 | |
| JP | 2012-3064 A | 1/2012 | |

* cited by examiner

*Primary Examiner* — Ghassem Alie
(74) *Attorney, Agent, or Firm* — Anova Law Group, PLLC

(57) ABSTRACT

A full-automatic optical fiber container connected with an optical fiber cutting unit includes a first shell and a second shell. The first shell includes a bottom case for containing optical fiber, and a cover pivotally connected with a top of the bottom case. An upper fiber collecting shaft is set at the cover and a lower fiber collecting shaft is set at the bottom case. The two shafts are rotationally connected to an opening of the first shell. The second shell includes a container driving unit that connects with the fiber cutting unit's top cap fixedly, a transmission unit that connects with the container driving unit and the lower fiber collecting shaft, and only engages one-way transmission; and a container lever that is flexibly connected with the first shell's cover. The three parts are set in the second shell with flexible connection respectively.

4 Claims, 3 Drawing Sheets

FULL-AUTOMATIC OPTICAL FIBER CONTAINER

TECHNICAL FIELD

This application relates to the optical fiber container, especially relates to a full-automatic optical fiber container.

BACKGROUND ART

The optical fiber container is a kind of equipment used cooperative with the optical fiber cutting unit. It is used to collect the discarded fiber left by the cutting unit. The automatic fiber container automatically collects the discarded fiber ends left by the cutting unit. But the optical fiber containers now available have several defects as shown below:

A. The main part of the automatic optical fiber container now available is short in length. The fiber collecting shaft cannot collect long discarded fiber. If the discarded fiber is relatively long, it cannot be rolled in the container completely, thus leading to operational inconvenience. So the operator has to be cautious about the length when he is stripping the fiber. The existing optical fiber container can collect discarded optical fiber with the length of about 15 mm, those discarded fibers with length over 20 mm is difficult to be rolled into the container.

B. The existing optical fiber container cannot hold large quantity of discarded fiber. It can only hold about 300 fiber ends. Thus its operational efficiency is very low.

C. The fiber collecting shafts of the existing container can rotate both-way. When the discarded fiber is relatively long, the fiber collecting shafts will rollback to drive the fiber away from the container.

SUMMARY

The aim of this disclosure is to provide a full-automatic optical fiber container to solve the technical problems with the existing optical fiber container. These problems make it difficult to collect relatively long discarded fiber, because the main part of the container is short and the fiber collecting shafts can only roll in short length of fiber.

In order to solve these problems, this disclosure provides with a full-automatic optical fiber container. It is connected with the fiber cutting unit, including two shells named NO. 1 and NO. 2 respectively. The NO. 1 shell includes a bottom case which is used to contain optical fiber ends and a cover, and the cover is pivotally connected with the top of the bottom case. An up fiber collecting shaft, also referred as an upper fiber collecting shaft, is set at the cover and a down fiber collecting shaft, also referred as a lower fiber collecting shaft, is set at the bottom case correspondingly. These two shafts are both put at the opening of the NO. 1 shell. The NO. 2 shell includes the container driving unit, the transmission unit and a lever. And the container driving unit, the transmission unit and the lever are put together in the NO. 2 shell with flexible connection. The container driving unit is connected with the fiber cutting unit's top cap fixedly. The transmission unit is transmission-connected with the container driving unit, and it can only fulfill one-way transmission and is transmission connected with the down fiber collecting shaft. The lever is flexibly connected with the NO. 1 shell's cover. When the top cap of the fiber cutting unit is open, then the container driving unit of the container begins to turn, then the transmission unit is driven in one way to make the up and down fiber collecting shafts to roll oppositely. In this way the container driving unit triggers the lever and its end rises to open the NO. 1 shell's cover, leading to the separation of the two optical fiber collecting shafts.

Preferably, the said container driving unit includes a pendulum shaft and a turn part. The pendulum shaft and the turn part mentioned are connected fixedly, and the pendulum shaft protrudes from within the said NO. 2 shell. The outer end of the pendulum shaft is connected with the top cap of the optical fiber cutting unit fixedly. And the turn part is rotationally connected within the NO. 2 shell.

Preferably, the said lever is pivotally connected within the NO. 2 shell. The lever is L-shaped, including a horizontal and a longitudinal rod. The longitudinal rod is connected with the front part of the horizontal one, and the back end of the horizontal rod touches the NO. 1 shell's cover. The container turn part can turn and press the longitudinal rod.

Preferably, the transmission unit includes the ratchet drive components and the gear drive components. The ratchet drive components are rotationally connected within the NO. 2 shell and can only drive in one direction. The ratchet drive components and gear drive components can engage one-way meshing transmission.

Preferably, the ratchet drive components include a ratchet and a ratchet shaft. The ratchet encircles the ratchet shaft and is one-way rotationally connected with it. The ratchet shaft is rotationally connected within the NO. 2 shell. And the ratchet shaft is connected with the container turn part fixedly.

Preferably, the said gear drive components include a small transmission gear, a turbine and an optical fiber collecting gear. The small transmission gear shares the same shaft with the turbine and is fixedly connected with the shaft. The shaft is rotationally connected within the NO. 2 shell. The small transmission gear can engage one-way transmission with the ratchet mentioned above. The optical fiber collecting gear shares the same shaft with the down fiber collecting shaft and is connected with it fixedly. The turbine engages transmission with the fiber collecting gear.

Preferably, the gear ratio of the ratchet to the small transmission gear is 0.23~0.43, and the gear ratio of the turbine to the fiber collecting gear is 0.25~0.35.

Preferably, the NO. 2 shell includes a second bottom case and a second cover, and the second cover is clamped in the second bottom case.

Preferably, it includes two connecting arms which are used to connect with the optical fiber cutting unit. The two arms are located at the outside of the first and second bottom case.

Preferably, the second bottom case and the two connecting arms are made up wholly, that is as a whole part.

Compared to the existing technology, this disclosure has following effects:

The present disclosure refers to a full-automatic optical fiber container. It includes a No. 1 shell for placing discarded fiber. The No. 1 shell can open and close automatically, and the inside space is bigger because of its deeper and longer main container. So it can hold more discarded fiber segments or ends. During operation, the operator does not have to focus on the length of the fiber striped. In this example, a fiber segment longer than 45 MM can be collected. It works easily with high efficiency, and what's more, the gear ratio inside the container is high, thus making it capable of collecting longer fiber. It can roll in 32 MM long fiber automatically and facilitate the operator's work greatly.

Secondly, the ratchet set inside the container can only turn in one way, thus the fiber collecting shafts can only rotate in the containing direction. So the discarded fiber will be put into the container and will not go in the opposite direction.

EMBODIMENT

The disclosed embodiment is described in details with the appended drawings below.

Figure 1:
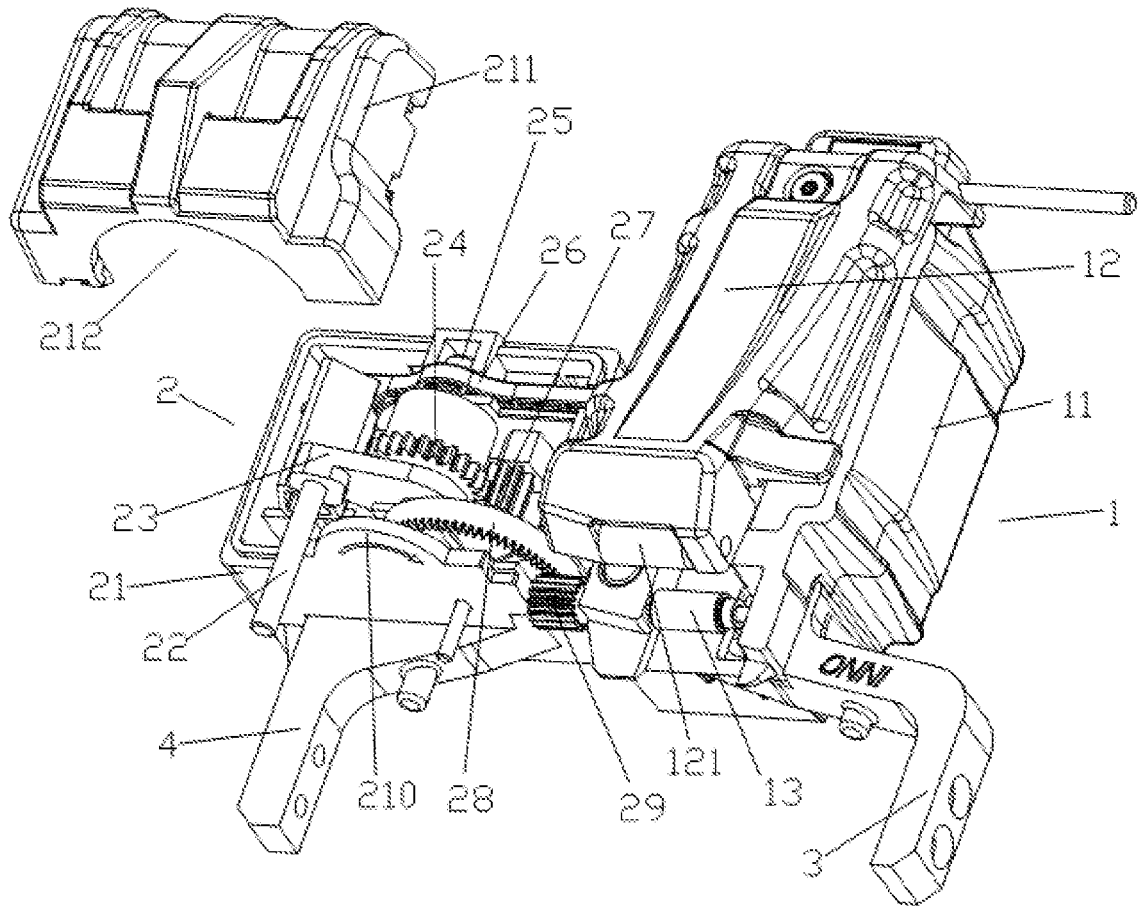
FIG. 1 is the structure diagram of the full-automatic optical fiber container of the disclosed embodiment.

Refer to the FIG. 1 please, the disclosed embodiment provides with a full-automatic optical fiber container. The container is connected with the fiber cutting unit for use. The container includes a NO. 1 shell 1 and a NO. 2 shell 2. The NO. 1 shell 1 is used to contain discarded fiber, and its inside space is huge enough to hold more discarded fiber ends. The NO. 1 shell 1 includes a bottom case 11 and a cover 12, and the cover 12 is pivotally connected with the top of the bottom case 11. An up/upper fiber collecting shaft 121 is set at the cover 12 and a down/lower fiber collecting shaft 13 is set at the bottom case 11 correspondingly. These two shafts are both put at the opening of the NO. 1 shell. In this disclosed embodiment, if the cover 12 is closed, when the down fiber collecting shaft 13 rotates, it will drive the up fiber collecting shaft 121 rotating contrarily. Optical fiber is put between the up shaft 121 and the down shaft 13, and the oppositely rotation of the two shaft will help to roll the fiber into the NO. 1 shell 1. In this disclosed embodiment, the up optical fiber collecting shaft 121 and the down fiber collecting shaft 13 are both made of elastic materials. Rubber is preferred, but is not the only choice. The NO. 2 shell includes a second bottom case 21 and a second cover 211. Inside the bottom case 21 there are the container driving unit, the transmission unit and a lever 26, and the three parts are put together inside the bottom case 21 with flexible connection. The container driving unit is connected with the fiber cutting unit's top cap 100 fixedly. The transmission unit is transmission-connected with the container driving unit, and it can only fulfill one-way transmission. So the transmission unit can only drive the down fiber collecting shaft 13 in one direction. The lever 26 is flexibly connected with the NO. 1 shell's cover 12. The NO. 2 shell's cover 211 covers up the container driving unit, the transmission unit and the lever 26.

In this disclosed embodiment, when the top cap 100 of the fiber cutting unit is open, the container begins to operate. The procedure is as shown below: the container driving unit turns with the fiber cutting unit's top cap 100, and it drives the transmission unit to rotate, the transmission unit then drives the down fiber collecting shaft 13 to rotate in the direction of the opening of the NO. 1 shell. Then the down fiber collecting shaft 13 drives the up fiber collecting shaft 121 to rotate oppositely. In this way, the cut discarded fiber is roll into the bottom case 11, and then the container driving unit rotates further and triggers the lever 26, making its end rise to open the cover 12 of the NO. 1 shell. Then the up fiber collecting shaft 121 separates from the down one 13, and the fiber collection begins to stop. The cover 12 of the NO. 1 shell is open to prepare for the placement of the fiber once again. When the top cap 100 of the cutting unit is closed, the container driving unit returns to its initial position, separating from the lever 26. Then the NO. 1 shell's cover 12 begins to fall naturally because of its own gravity. Thus the NO. 1 shell is closed and the fiber is clamped, getting ready for the next time fiber collecting.

The NO. 1 shell 1 and the NO. 2 shell 2 are different containing shells, and outside of the shell 1 and the shell 2, there are the first connecting arm 3 and the second connecting arm 4 which are used to connect the fiber container and the fiber cutting unit. In this model, the connecting arm 3 and the connecting arm 4 are both of L-shape. And in the two arms there are mounting holes helping to connect with the fiber cutting unit. This disclosed embodiment doesn't set any restrictions on the structure of the arms and on the specific connecting type between the arms and the fiber cutting unit. And the type mentioned above is only one example. In this example, the NO. 2 shell's bottom case 21, the first connecting arm 3 and the second connecting arm 4 can be made as a whole part. They can also be connected fixedly. This disclosed embodiment has no restrictions. But for the simplicity of procession, it's better to make the NO. 2 shell's bottom case 21, the first connecting arm 3 and the second connecting arm 4 as a whole part. What's more, in order to let the container and the cutting unit be connected firmly, the first connecting arm 3 should be connected at the outside of the NO. 1 shell's bottom case 11, and the second connecting arm 4 should be connected at the outside of the NO. 2 shell's bottom case 21.

In this example, the container driving unit locates at the front part of the No. 2 shell's bottom case 21, and it comprises a pendulum shaft 22 and a turn part 23. Here the turn part 23 is a cam, and the pendulum shaft 22 is vertically fixedly connected to the top part of the turn part 23. The pendulum shaft 22 protrudes from within the said No. 2 shell's bottom case 21. The outer part of the pendulum shaft 22 is connected with the top cap 100 of the optical fiber cutting unit fixedly. And the turn part 23 is rotationally connected within the No. 2 shell's bottom case 21. In this example, an arc wall 210 is set at the front part of the No. 2 shell's bottom case 21. Correspondingly, an arc gap 212 is set at the No. 2 shell's cover 211. After the cover 211 and the bottom case 21 are clamped together, a cambered slipway forms up. The pendulum shaft 22 can move in this slipway. When the top cap 100 of the cutting unit is not open, the pendulum shaft 22 locates at the right side of the cambered slipway. When the top cap 100 is opened the pendulum shaft 22 will turn from the right side to the left side. After it turns to the end of the left side the No. 1 shell's cover 12 opens to its upmost extent.

In this example, the lever 26 is pivotally connected within the NO. 2 shell 2. The lever is L-shaped, including a horizontal rod and a longitudinal rod. The longitudinal rod is connected with the front part of the horizontal one, and the back end of the horizontal rod touches the NO. 1 shell's cover 12. The turn part of the container can turn and press the longitudinal rod. In this example, when the pendulum shaft 22 turns to the left side, the longitudinal rod of the container lever 26 is touched and pressed down by the turn part 23. That is, when the top cap 100 of the fiber cutting unit is open, the pendulum shaft 22 turns from the right to the left side in the slipway as shown in the figure, then the head of the turn part 23 presses on the lever 26. The pendulum shaft 22 is driven to turn further, and the turn part 23 presses down the lever 26 further, making the back end of the lever 26 which touches the NO. 1 shell' cover 12 rise little by little until the NO. 1 shell's cover 12 is open.

In this example, the transmission unit includes the ratchet drive components and the gear drive components. The ratchet drive components are rotationally connected within the NO. 2 shell and can only drive in one direction. The ratchet drive components and gear components can engage one-way transmission. Details are as follows:

The ratchet drive components include a ratchet 24 and a shaft 25. The ratchet 24 encircles the shaft 25 and is one-way rotationally connected with it. The shaft 25 is rotationally connected within the No. 2 shell 2. And the ratchet shaft 25 is connected with the turn part 23 fixedly. In this example, the pendulum shaft 22, the turn part 23 and the ratchet shaft 25 are connected fixedly. And it's better for them to be made as a whole part. When the pendulum shaft 22 turns to the left side, it drives the ratchet's shaft 25 to rotate counter-clockwise. Consequently the ratchet 24 rotates counter-clockwise too. When the pendulum shaft 22 turns to the right side, it drives the ratchet's shaft 25 to rotate clockwise. But at this time the ratchet 24 doesn't rotate, because the ratchet shaft 25 can only drivers the ratchet 24 in one direction.

In this example, the turn part 23 is at the front part of the ratchet shaft 25, the container lever 26 is at the end of the ratchet shaft 25, and the ratchet 24 locates between the turn part 23 and the container lever 26.

The gear drive components include a small transmission gear 27, a turbine 28 and an optical fiber collecting gear 29. The small transmission gear 27 shares the same shaft with the turbine 28 and is fixedly connected with the shaft. The turbine shaft is rotationally connected within the NO. 2 shell 2. The small transmission gear 27 can engage one-way transmission with the ratchet 24. The optical fiber collecting gear 29 shares the same shaft with the down fiber collecting shaft 13 and is connected with it fixedly. The turbine 28 engages meshing transmission with the fiber collecting gear 29. The pendulum shaft 22 turns around the ratchet shaft 25, driving the ratchet 24 to rotate which transmits its rotation to the small transmission gear 27, the turbine 28 and the fiber collecting gear 29. Thus the down fiber collecting shaft 13 and the up fiber collecting shaft 121 are driven oppositely to roll the cut discarded fiber into the NO. 1 shell 1. In this example, through the meshing transmission among the ratchet 24, the small transmission gear 27, the turbine 28 and the fiber collecting gear 29, a relatively high gear ration can be obtained. When the pendulum shaft 22 turns 13.57 degrees around the ratchet shaft 25 the ratchet 24 turns one tooth correspondingly. While the pendulum shaft 22 turns 95 degrees (the ratchet 24 has 24 teeth, the small transmission gear 27 has 8 teeth, the fiber collecting gear 29 and the turbine 28 have the same amount of module; the turbine 28 has 72 teeth, the fiber collecting gear 29 has 16 teeth, the fiber collecting gear 29 and the turbine 28 have the same module number; the diameter of the down fiber collecting shaft is 4 mm, so the perimeter of it is 12.56 mm), the ratchet 24 turns 7 teeth, the small transmission gear turns 7 teeth (315 degrees). At the same time, the turbine 28 turns 63 teeth, driving the fiber collecting gear 29 to rotate 3.93 turns. Because the down fiber collecting shaft 13 rotates concentrically with the fiber collecting gear 29, the total length of the collected fiber=the turns of the fiber collecting gear 29*the perimeter of the down fiber collecting shaft=12.5*3.93=49.36 mm. The gear ration i=N1/N2=Z2/Z1, in this disclosed embodiment, the gear ratio of the ratchet 24 and the small transmission gear 27 equals to 0.23~0.43; the gear ratio $i_2$ of the turbine 28 and the fiber collecting gear 29 equals to 0.25~0.35. In this example, the optimal ratios are as following: $i_1$=0.33, $i_2$=0.25. Because the transmission group has the highest gear ration, during opening process of the fiber cutting unit's top cap, through the coordination of these gears, the down fiber collecting shaft 13 can rotate more turns, so it can roll longer discarded fiber.

In this example, when the pendulum shaft 22 turns to the left side, it drives the ratchet's shaft 25 to rotate counter-clockwise. Consequently, the ratchet 24 is driven to rotate counter-clockwise. And then the ratchet drives the small transmission gear 27 to rotate clockwise through gear transmission. The turbine 28 then is driven to rotate clockwise by the small gear 27. As a result, the turbine 28 then transmits its rotation to the fiber collecting gear 29, making it to roll from outside to inside. The fiber collection gear 29 then drives the down fiber collecting shaft 13 to roll from outside to inside. The down fiber collecting shaft 13 drives the up fiber collecting shaft 121 to rotate oppositely to roll the fiver into the No. 1 shell.

When the pendulum shaft 22 turns to the right side, it drives the ratchet's shaft 25 to rotate clockwise. But at this time, the ratchet 24 doesn't rotate, so the small transmission gear 27 doesn't rotate, the turbine 28 and the fiber collecting gear 29 don't rotate either, and as a result, the down fiber collecting shaft 13 doesn't rotate too.

Figure 2:
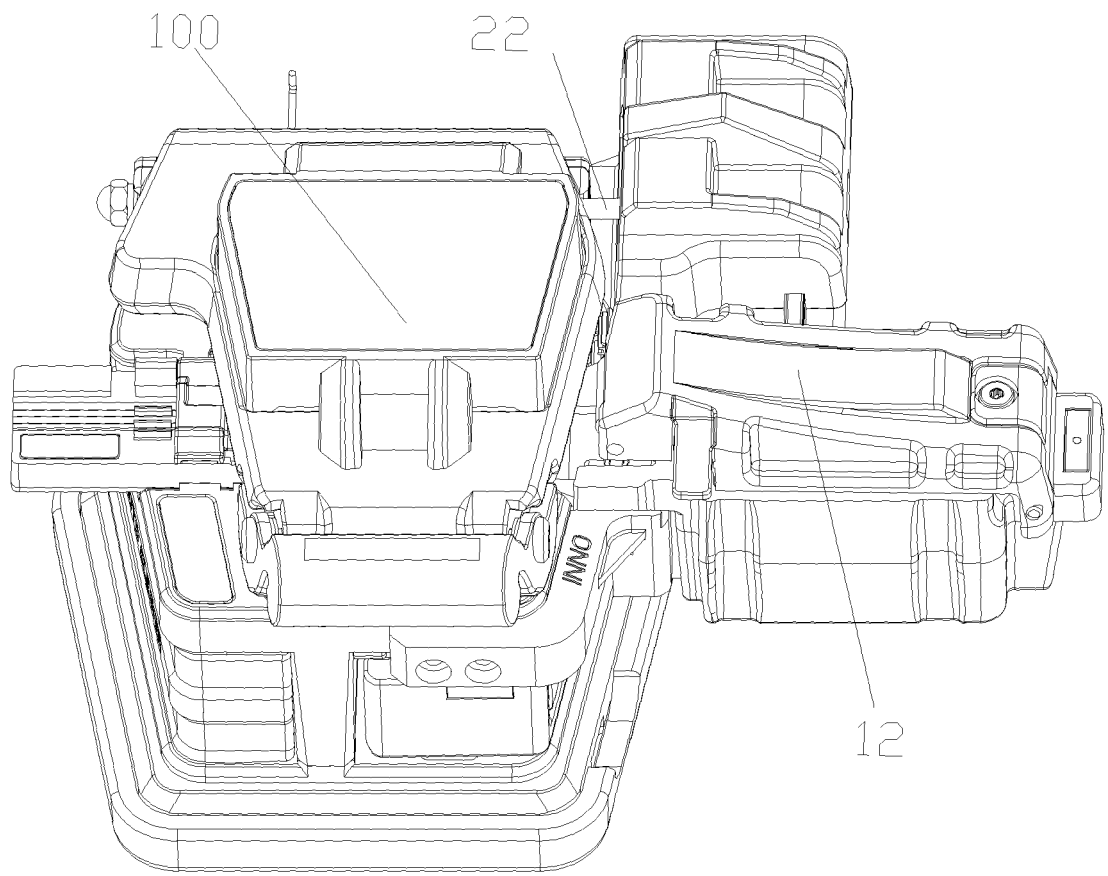
FIG. 2 is the structure diagram showing the situation when the top cap of the fiber cutting unit is closed and the optical fiber container doesn't work.

Please refer to FIG. 2, through the first connecting arm 3 and the second connecting arm 4 the full-automatic optical fiber container is connected with the fiber cutting unit firmly. The pendulum shaft 22 is connected with the cutting unit fixedly. When the top cap 100 of the cutting unit is not open, the pendulum shaft 22 is at the right side of the cambered slipway.

Figure 3:
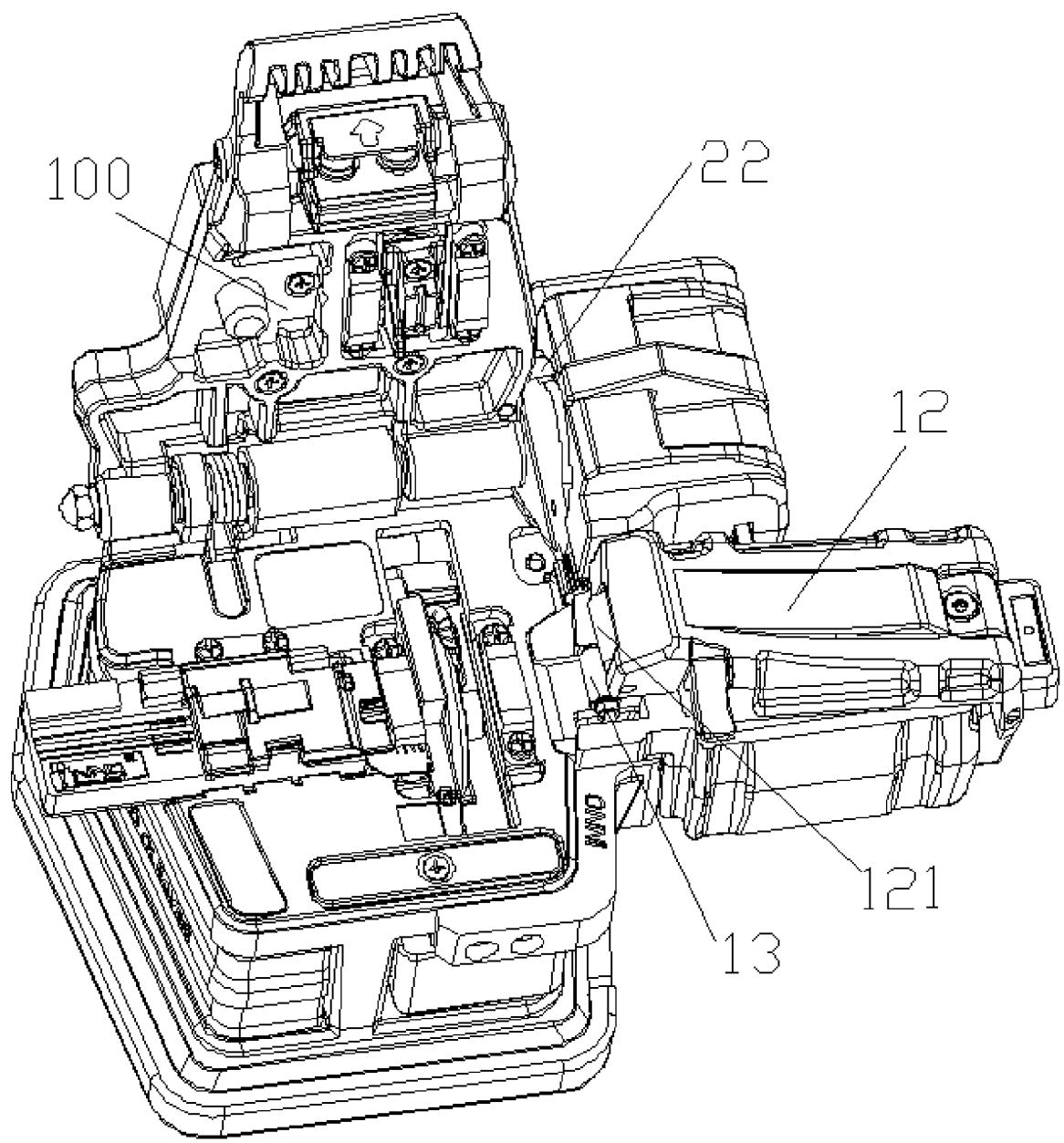
FIG. 3 is the structure diagram showing the situation when the top cap of the fiber cutting unit is open and the optical fiber container begins to operate.

Refer to FIG. 3 please, in this disclosed embodiment, the pendulum shaft 22 and the top cap 100 of the fiber cutting unit are connected fixedly. When the top cap 100 of the fiber cutting unit opens, the pendulum shaft 22 begins to turn from the right to the left side of the slipway. It then makes the container driving unit beginning to move which in turns drives the transmission unit to rotate, and the transmission unit then drives the down fiber collecting shaft 13 to rotate towards the opening of the NO. 1 shell. Then the down fiber collecting shaft 13 drives the up fiber collecting shaft 121 to rotate oppositely. After this, the container driving unit rotates further and presses down the left end of the lever 26, making its right end rise to open the cover 12 of the NO. 1 shell. Then the up fiber collecting shaft 121 separates from the down one 13, and the fiber collection begins to stop. When the top cap 100 of the cutting unit is closed, the drive unit of the container returns to its initial position, separating from the lever 26. Then the NO. 1 shell's cover 12 begins to fall naturally because of its own gravity. Thus the NO. 1 shell is closed and the fiber is clamped, getting ready for the next time fiber collecting.

The operating principle of this full-automatic optical fiber container is as below:

First, when the top cap 100 of the fiber cutting unit is open, the pendulum shaft 22 begins to turn by it from the right to the left side of the slipway. Then the pendulum shaft 22 presses down the left end of the lever 26, making its right end rise. Thus, the cover 12 of the NO. 1 shell touched by the right end of the lever 26 is raised, getting ready to place the fiber.

Next is the process of cutting the fiber: firstly, using a fiber pinchers to remove the fiber's outside layer, and then using some degreasing cotton soaked with alcohol to protect and clean the naked fiber. After this, placing the cleaned fiber in the fiber placing groove of the cutting unit, putting one end of the fiber inside the NO. 1 shell crossing the down fiber collecting shaft 13. Closing the top cap 100 of the fiber cutting unit, and at this moment the pendulum shaft 22 turns from the left to the right side, and it no longer presses the lever 26, so the right end of the lever 26 doesn't rise against the cover 12. Thus the cover 12 falls to press the end of the fiber because of gravity.

After that, push the guide rail of the cutting blade in the cutting unit to cut the fiber, and open the top cap 100 of the unit by hand. At the time the pendulum shaft 22 turns from the right to the left side, driving the turn part 23 and in turn driving the ratchet 24 to rotate counter-clockwise. The ratchet 24 drives the small transmission gear 27 through meshing transmission, leading the turbine 28 to rotate clockwise. And next, the turbine 28 drives the fiber collecting gear 29 to rotate towards the container. Then the down fiber collecting shaft 13 and the up fiber collecting shaft 121 are both driven towards the No. 1 shell's bottom case and roll the discarded fiber into it. The pendulum shaft continues turning to the left side, and the lever 26 is pressed, thereby raising the cover 12, making it easy for the next time fiber placement.

The above disclosed are only one specific embodiments of this application, but this application is not limited to the above, and any changes thought by those skilled in this field should fall in the scope of the protection of this application.

The invention claimed is:

1. A full-automatic optical fiber container connected with an optical fiber cutting unit, comprising:
    a first shell including a bottom case and a cover; and
    a second shell including three parts: a container driving unit, a transmission unit and a container lever,
    wherein:
    the bottom case of the first shell is used to contain optical fiber,
    the cover of the first shell is pivotally connected with a top of the bottom case,
    an upper fiber collecting shaft is set at the cover and correspondingly a lower fiber collecting shaft is set at the bottom case,
    the upper fiber collecting shaft and the lower fiber collecting shaft are both rotationally connected to an opening of the first shell,
    the three parts included in the second shell are put together in the second shell with flexible connection respectively,
    the container driving unit is fixedly connected with a top cap of the optical fiber cutting unit,
    the transmission unit is connected with the container driving unit, the transmission unit can only fulfill one-way transmission and is connected with the lower fiber collecting shaft,
    the container lever is flexibly connected with the cover of the first shell, and
    when the optical fiber cutting unit's top cap is opened to let the container driving unit begin to turn, the transmission unit begins to engage one-way transmission and drive the upper fiber collecting shaft and the lower fiber collecting shaft to rotate oppositely, the container driving unit triggers the container lever, making an end of the container lever rises to open the cover of the first shell, separating the upper optical collecting shaft and the lower optical fiber collecting shaft.

2. The full-automatic optical fiber container according to claim 1, wherein:
    the container driving unit includes a pendulum shaft and a turn part fixedly connected to each other,
    the pendulum shaft protrudes from the second shell,
    an outer end of the pendulum shaft is fixedly connected with the top cap of the optical fiber cutting unit, and
    the turn part is rotationally connected within the second shell.

3. The full-automatic optical fiber container according to claim 2, wherein:
    the container lever is pivotally connected with the second shell,
    the container lever is an L-shape lever, including a horizontal rod and a longitudinal rod,
    the longitudinal rod is connected with a front part of the horizontal rod,
    a back part of the horizontal rod touches the first shell's cover, and
    the turn part can turn and press the longitudinal rod.

4. The full-automatic optical fiber container according to claim 2, wherein:
    the transmission unit includes ratchet drive components and gear drive components,
    the ratchet drive components are rotationally connected in one direction within the second shell, and
    the ratchet drive components and the gear drive components can engage one-way transmission.

* * * * *